3,205,214
PIPERYLENE POLYMERIZATION

Thomas B. Talcott, Wadsworth Township, Ohio, assignor to The Firestone Tire & Rubber Company, Akron, Ohio, a corporation of Ohio
No Drawing. Filed May 15, 1961, Ser. No. 109,814
2 Claims. (Cl. 260—94.3)

This invention relates to the polymerization of piperylene, either cis-piperylene or trans-piperylene or a mixture of the two, and other monomers may be present. The invention relates more particularly to a process of polymerization using a catalyst containing iodine, either in combined or initially uncombined form.

A piperylene polymer produced by the invention contain in the piperylene portion over 98 percent 1,4-addition microstructure, and unexpectedly it is over 85 percent trans-1,4-addition polymer. The polymer of such high content of the trans-stereo isomer tends toward crystallinity, is tough and exceptionally strong; and the more nearly the trans-isomer content approaches 100 percent, the more accentuated are these properties. The high content of trans-1,4-addition is surprising, because when butadiene is polymerized in the same catalyst system, the percentage of cis-1,4-addition in the product is high.

The catalyst of the invention comprises a hydrocarbon aluminum compound and a halide of titanium or zirconium, there being at least about one atom of iodine present for each atom of the Group IV metal in the catalyst. This iodine requirement can be met by use in the catalyst combination of titanium tetraiodide, $TiI_3$, $TiI_2$, $TiI_2Cl_2$, $TiI_2Br_2$, $TiI_2BrCl$, $TiI_3Cl$, $TiI_3Br$ and similar halides. The iodine requirement can also be met by including in the catalyst makeup an iodine-containing organoaluminum compound, such as an alkylaluminum diiodide, a dialkyl-aluminum iodide, an alkylaluminum chloroiodide and similar compounds; in which case at least sufficient of the aluminum compound is utilized to provide the required amount of iodine in the catalyst. A further alternative catalyst is provided by addition of elemental iodine to a hydrocarbon aluminum-titanium chloride or bromide (or the analogous zirconium salts) catalyst, sufficient iodine being provided to supply at least about one atom of iodine per atom of the Group IV metal present. Mixtures of the various catalyst combinations outlined above are operable so long as the iodine requirement is met. The molar ratio of aluminum compound to the Group IV metal halide in the catalyst is generally 0.5/1.0 to 4.0/1.0, and usually in the range of 1/1 to 3.5/1.

The aluminum component of the catalyst can, for example, be trimethyl aluminum, triethyl aluminum, any tripropyl aluminum, any tributyl aluminum or any other trialkyl aluminum in which the alkyl group contains up to about 8 or 10 carbon atoms, e.g., trioctyl-, trinonyl-, and tridecyl-aluminum; tribenzylaluminum or phenyldibutyl-aluminum; or it can be an alkyl aluminum chloride of the formula $alkyl_xAlCl_y$ in which $x$ and $y$ are whole numbers that total 3, such as dibutyl aluminum chloride, ethyl aluminum dichloride, etc., and in which the alkyl group can be any of the foregoing alkyl groups which contain u pto 8 or 10 carbon atoms. The alkyl groups can be straight or branched chain and any one aluminum component can contain alkyl groups in which there are a different number of carbon atoms. Analogous alkenyl groups can be substituted for the alkyls named above. Any usual catalytic amount of the two catalytic components can be used within the range of, for example, 0.2 to about 20 millimoles per 100 grams of monomer.

Piperylene can be polymerized by the method of the invention either as the sole monomer or in the presence of one or more additional ethylenically unsaturated compound, with which it may or may not copolymerize, depending upon the specific monomer and the specific catalyst combination. For instance, a mixed hydrocarbon stream containing both piperylene and isoprene can be treated to polymerizing conditions in accordance with the invention to polymerize the piperylene selectively, leaving all or most of the isoprene in the stream unpolymerized. A different catalyst ratio or combination within the scope of the invention can be utilized to produce a piperylene-isoprene copolymer. On the other hand, a hydrocarbon stream containing both piperylene and butadiene-1,3 can be copolymerized to a useful rubbery polymer by the invention. Other monomers can be copolymerized with piperylene by means of the invention, including, without limitation, styrene, alpha-methylstyrene, vinyltoluene, chlorostyrene, 2,3-dimethylbutadiene-1,3 and other suitable alpha-olefins.

Any hydrocarbon solvent for the monomer can be used, such as pentane, hexane, petroleum ether, heptane, octane, benzene, toluene, a xylene, isoprene or other hydrocarbon solvent that is liquid at the polymerization temperature. A mixture of solvents, e.g., xylene and pentane, can be used. Excess piperylene can be used as solvent. A polymerization temperature of about 0° to 100° C. is satisfactory.

The following examples illustrate the invention. All parts and percentages are by weight unless otherwise indicated. In Examples 3–5, trans-piperylene (substantially free of cis-piperylene) was subjected to polymerization. The first example describes the preparation of this material.

EXAMPLE 1.—PREPARATION OF TRANS-PIPERYLENE

The piperylene used was a by-product from the preparation of isoprene and had the following analysis:

|  | Percent |
|---|---|
| Trans-piperylene | 58.6 |
| Cis-piperylene | 34.5 |
| Isoprene | 1.2 |
| Cyclopentadiene | 4.1 |
| Isopropenyl acetylene | 1.6 |

The cyclopentadiene and isopropenyl acetylene are generally considered polymerization inhibitors. The former was removed by reaction with maleic anhydride; the latter was removed by admixture with a reagent containing the cuprous ion.

Pure trans-piperylene was produced from the purified mixture of cis- and trans-isomers by the sulfone method of David Craig, Journal of the American Chemical Society, volume 65, page 1006 (1943). The product (trans-piperylene) was completely free of cis-piperylene and contained less than 1 percent of isoprene as the only impurity.

EXAMPLE 2

The piperylene used in this experiment was a mixed piperylene which in addition to a trace of isoprene contained about 63 percent trans-piperylene and 37 percent cis-piperylene. The details of the process and an analysis of the product are given in Table I. The amount of each catalyst component is given as millimoles per each 100 grams of piperylene used.

EXAMPLES 3–5

The trans-piperylene of Example 1 and benzene were dried by distilling off a portion and discarding the distillate. Three polymerization bottles were charged with the monomer and solvent. They were then capped, using rubber liners; the catalyst components were injected through the liners so that they reacted and formed the active catalyst in situ; and the bottles were turned end-over-end in a polymerization bath. The details of the charges, the polymerization process, and the products are summarized in the following table where they are designated Examples 3, 4 and 5. The charge is given in grams. The microstructures of the products were determined by known infrared technique.

invention with hevea rubber, synthetic cis-polyisoprene, butadiene-styrene synthetic rubbers and/or with polybutadiene rubbers are usefully vulcanized into pneumatic tire treads, sidewalls and body stocks, as well as into many mechanical rubber goods. The unvulcanized polypiperylene can be chlorinated to provide a useful substitute for chlorinated natural rubber in coatings and adhesives.

What is claimed is:

1. The process of polymerizing piperylene which comprises treating the piperylene in a hydrocarbon solvent at a temperature between 0 and 100° C. with 0.2 to 20 millimoles of catalyst per 100 moles of monomer, the catalyst being composed of a trialkyl aluminum compound and a halide of titanium that includes at least one atom of iodine for one atom of titanium, the molar ratio of the aluminum compound to the halide being within the range of 0.5/1 to 4/1.

2. The process of claim 1 in which the titanium halide is titanium tetraiodide.

*Table I.—Polymerization of piperylene*

|  | Example 2 | Example 3 | Example 4 | Example 5 |
|---|---|---|---|---|
| Mixed Piperylenes (g.) | 100 |  |  |  |
| Trans-Piperylene (g.) |  | 100 | 100 | 100. |
| Benzene (g.) | 440 | 200 | 200 | 200. |
| Al($C_2H_5$)$_3$ (mm. per/100 g. monomer) | 7.5 | 2.6 | 2.6 | 4.4. |
| TiI$_4$ (mm. per/100 g. monomer) | 2.5 | 2.2 | 1.05 | 1.76. |
| Molar Ratio, Al($C_2H_5$)$_3$/TiI$_4$ | 3.0 | 1.2 | 2.5 | 2.5. |
| Temperature (° C.) and Time (hours) | 72 hrs. at 30° | 48 hrs. at 5°; 24 hrs. at 32° | 20 hrs. at 5°; 52 hrs. at 50° | 24 hrs. at 5°; 48 hrs. at 32°. |
| Appearance of Polymer Solution |  | Thick syrup | Syrupy | Syrupy. |
| Conversion, percent | 77.4 | 84 | About 50 | About 55. |
| Microstructure: |  |  |  |  |
| cis-1,4 percent | 16.2 | 6.8 | 10.7 | 4.4. |
| trans-1,4 percent | 83.8 | 92.9 | 88.4 | 94.8 |
| 1,2 percent | 0.0 | 0.5 | 0.9 | 0.8. |

In Examples 3–5, polymerization was slight at 5° C., but was substantial at about room temperature, and polymerization in the range of about 15 to 50° C. is preferred. The high content of trans-1,4-addition polymer is characteristic of all of these products.

The polypiperylene of the invention, its copolymers with other diolefins and its copolymers in which it predominates are ethylenically unsaturated polymers, more or less rubbery in nature, and capable of being vulcanized to a more elastic, less thermoplastic condition by means of known curing agents of natural rubber and butadiene-styrene synthetic rubber. Vulcanization accelerators useful in these prior art general purpose rubbers are generally effective in speeding the cure of the novel piperylene polymers. The polymers of the invention, especially in the vulcanized state, exhibit excellent resistance to ozone. Blends of the unvulcanized piperylene polymers of the

References Cited by the Examiner

UNITED STATES PATENTS

| 2,959,576 | 11/60 | Payne | 260—94.9 |
| 2,979,488 | 4/61 | Carpenter | 260—79 |
| 2,999,087 | 9/61 | Thomas et al. | 290—94.3 |
| 3,050,513 | 8/62 | Zelinski et al. | 260—94.3 |

FOREIGN PATENTS 827,365   2/60   Great Britain.

OTHER REFERENCES

Natta et al.; "Stereospecific Catalysts and Stereoregular Addition Polymers," volume III, article No. 80, 1958.

JOSEPH L. SCHOFER, *Primary Examiner.*

L. H. GASTON, LEON J. BERCOVITZ, *Examiners.*